(12) United States Patent
Takahashi

(10) Patent No.: US 8,771,887 B2
(45) Date of Patent: Jul. 8, 2014

(54) METHOD OF OPERATING A FUEL CELL APPARATUS

(71) Applicant: Kyocera Corporation, Kyoto (JP)

(72) Inventor: Naruto Takahashi, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 13/966,811

(22) Filed: Aug. 14, 2013

(65) Prior Publication Data

US 2014/0011106 A1    Jan. 9, 2014

Related U.S. Application Data

(62) Division of application No. 12/673,969, filed as application No. PCT/JP2008/065047 on Aug. 22, 2008, now abandoned.

(30) Foreign Application Priority Data

Aug. 29, 2007    (JP) ................................ 2007-222980

(51) Int. Cl.
*H01M 8/06* (2006.01)

(52) U.S. Cl.
USPC ........................................................ 429/423

(58) Field of Classification Search
CPC ................................... H01M 8/06; H01M 8/04
USPC ..................... 429/50–52, 408–427, 429–451, 429/512–516

See application file for complete search history.

(56) References Cited

U.S. PATENT DOCUMENTS

| | | | |
|---|---|---|---|
| 2002/0187375 A1* | 12/2002 | Baldauf et al. | 429/23 |
| 2003/0134166 A1* | 7/2003 | Skala et al. | 429/17 |
| 2003/0170510 A1* | 9/2003 | Robb et al. | 429/17 |
| 2003/0203262 A1* | 10/2003 | Stukey et al. | 429/26 |
| 2004/0047800 A1* | 3/2004 | Sennoun et al. | 423/652 |
| 2005/0158594 A1* | 7/2005 | Ahmed | 429/19 |
| 2006/0199051 A1* | 9/2006 | Bai et al. | 429/17 |
| 2009/0291335 A1 | 11/2009 | Anzai | |

FOREIGN PATENT DOCUMENTS

| | | |
|---|---|---|
| EP | 1909349 A1 | 4/2008 |
| JP | 2000-319004 A | 11/2000 |
| JP | 2004-220876 A | 8/2004 |
| JP | 2004-319420 A | 11/2004 |

(Continued)

OTHER PUBLICATIONS

English Translation of JP 2004319420 A.*

(Continued)

*Primary Examiner* — Patrick Ryan
*Assistant Examiner* — Kiran Quraishi
(74) *Attorney, Agent, or Firm* — Procopio, Cory, Hargreaves & Savitch LLP

(57) ABSTRACT

Method of operating a fuel cell apparatus in which a reforming reaction in the reforming portion is selected by a controller at the starting time of the apparatus by comparing a first starting temperature of a reforming portion to a temperature T1 at which steam reforming can be performed and comparing a second starting temperature of a vaporizing portion to a temperature T2 at which a predetermined amount of steam can be generated by steam reforming. A reforming reaction starting with an autothermal reforming reaction is performed when the first starting temperature is not lower than T1 and the second starting temperature is lower than T2.

12 Claims, 3 Drawing Sheets

(56) References Cited

FOREIGN PATENT DOCUMENTS

| | | | | |
|---|---|---|---|---|
| JP | 2004319420 A | * | 11/2004 | ............ H01M 8/06 |
| JP | 2004-338975 A | | 12/2004 | |
| JP | 2004-339007 A | | 12/2004 | |
| JP | 2005-317405 A | | 11/2005 | |
| JP | 2005317405 A | * | 11/2005 | ............ H01M 8/04 |
| JP | 2007-59377 A | | 3/2007 | |
| JP | 2007-179756 A | | 7/2007 | |
| JP | 2007-200709 A | | 8/2007 | |
| WO | 2006/073150 A1 | | 7/2006 | |

OTHER PUBLICATIONS

English Translation of JP 2005317405 A.*

* cited by examiner

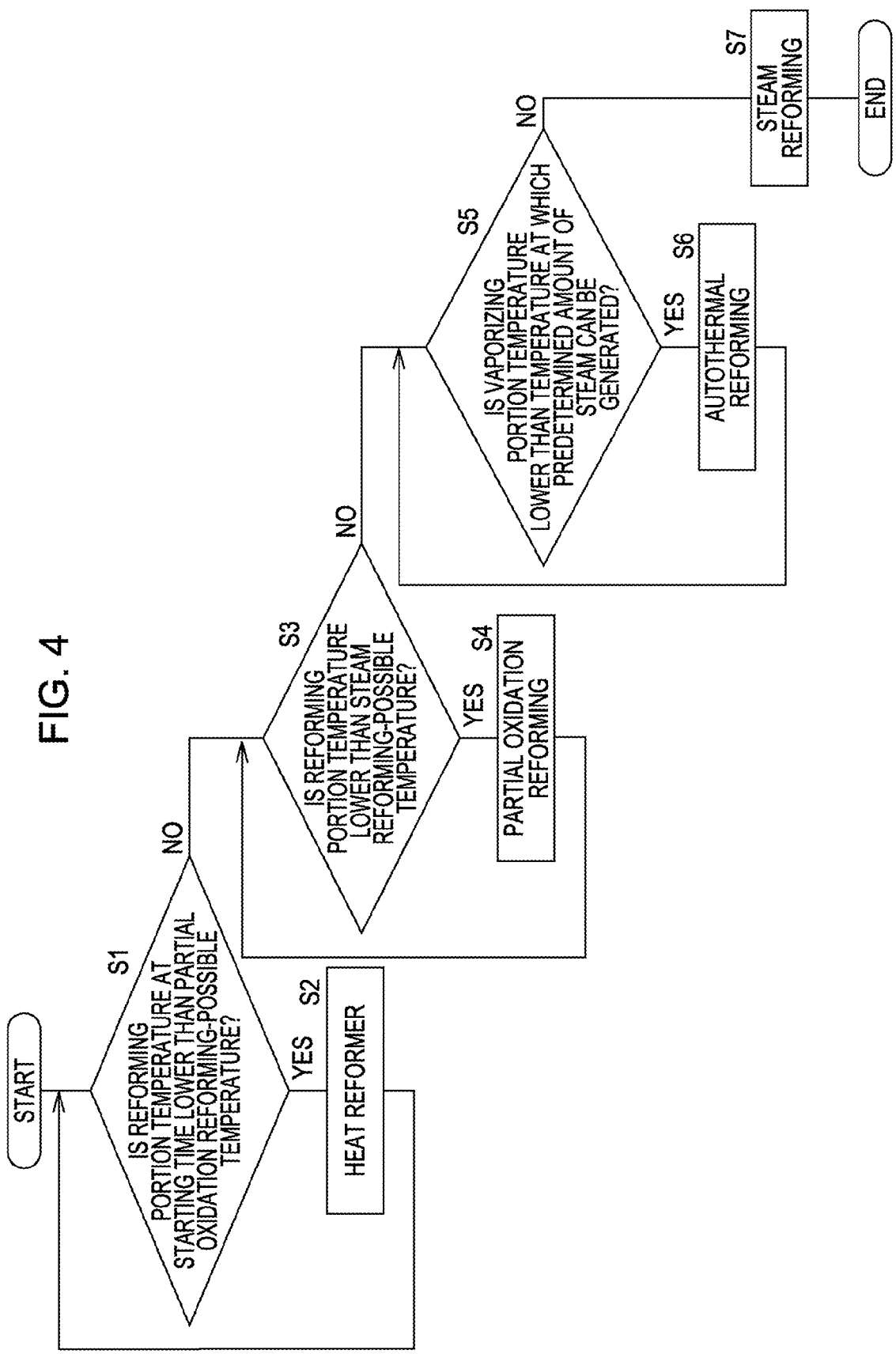

METHOD OF OPERATING A FUEL CELL APPARATUS

CROSS REFERENCE TO RELATED APPLICATIONS

This is a divisional application of U.S. application Ser. No. 12/673,969 which is the U.S. National Stage application of PCT application PCT/JP2008/065047 filed on Aug. 22, 2008, which claims priority under 35 U.S.C. §119 to Japanese Patent Application No. 2007-222980 filed on Aug. 29, 2007, and the contents of each of these applications are incorporated herein by reference in their entirety.

FIELD OF THE INVENTION

The present invention relates to fuel cell apparatuses, and particularly to a method of operating a fuel cell apparatus.

BACKGROUND

Fuel cell apparatuses and their operation methods have recently been proposed for next-generation energy. Fuel cells can generate electric power, using a fuel gas (hydrogen-containing gas) and an oxygen-containing gas (normally air), and the fuel cell apparatus comprises the fuel cell and auxiliary devices operating the fuel cell within an enclosure. For example, a fuel cell apparatus has been proposed which comprises within a housing case a cell stack comprising a plurality of fuel cells electrically connected in series, a reforming portion comprising a reforming catalyst, disposed over the cell stack, and a vaporizing portion generating steam to be supplied to the reforming portion (for example, Japanese Unexamined Patent Application Publication No. 2007-59377).

In the start-up operation of such a fuel cell apparatus, it is necessary to increase the temperature of the reforming portion, which reforms a reforming target gas (raw fuel) and supplies the reformed fuel gas (hydrogen-containing gas) to the fuel cell, to a predetermined value. It is also necessary to increase the temperature of the fuel cells (cell stack) to a predetermined value. After the fuel cells (cell stack) reach the predetermined temperature, the start-up operation is terminated and the fuel cell is brought into a power-generating state.

It is known that the start-up operation of the reforming portion performs partial oxidation reforming (pox), autothermal reforming (ATR) and steam reforming (SR) in that order for producing hydrogen used for fuel cell power generation from a reforming target gas (raw fuel) such as natural gas (for example, Japanese Unexamined Patent Application Publication No. 2004-319420).

More specifically, for example, it has been proposed that: when the temperature of the reforming portion is low, the reforming reaction is performed by partial oxidation reforming; the reforming reaction is switched from the partial oxidation reforming to autothermal reforming according to the temperature of the reforming portion increased by the partial oxidation reforming; and when the temperature of the reforming portion (vaporizing portion) is further increased, the reforming reaction is switched from the autothermal reforming to steam reforming. Accordingly, the temperature of the fuel gas generated in the reforming portion is increased as the temperature of the reforming portion is increased. In addition, it has been proposed for the type of fuel cell apparatus disclosed in the above-cited Patent Document that the temperature of the reforming portion be increased by heat generated by burning unreacted gas (reforming target gas) and the fuel gas in one end side (reforming portion side) of the fuel cells.

The fuel gas and unreacted gas (reforming target gas) warmed in the reforming portion in the start-up operation is supplied to the fuel cell (cells), and the fuel cell is thus warmed by the warmed fuel gas. Also, the fuel cell (cells) is heated by combustion reaction of the fuel gas and unreacted gas (reforming target gas) supplied to the fuel cell (cells) with an oxygen-containing gas. The temperature of the fuel cell is thus increased. When the reforming portion and the fuel cell (cells) come to predetermined temperatures, the start-up operation of the fuel cell apparatus is completed and the fuel cell (cells) starts power generation.

Accompanying the operation of the fuel cell apparatus, it may be suspended in some cases, for example, for maintenance or with an event of failure. The period of operational suspension of the fuel cell apparatus may be over several minutes to several hours (or, in some cases, several days). After maintenance or repairing the failure, the fuel cell apparatus is restarted to operate.

Unfortunately, if the temperature of the reforming portion of a fuel cell apparatus controlled to perform reforming reaction in the order of partial oxidation reforming, autothermal reforming and steam reforming is a predetermined value or more when the fuel cell restarts, the reforming target gas (raw fuel) supplied to the reforming portion may be rapidly increased. Accordingly, carbon, a constituent of the reforming target gas, may be easily precipitated, and, consequently the fuel cells may deteriorate. In addition, ignition for burning the fuel gas and unreacted gas (reforming target gas) in one end side of the fuel cells may become difficult.

Also, if partial oxidation reforming is performed in the reforming portion having a predetermined temperature or more at the starting time of the fuel cell apparatus, the reforming portion may easily come to high temperature. Such a condition may easily cause the reforming catalyst to deteriorate and its lifetime to decrease.

SUMMARY OF THE INVENTION

Accordingly, an object of the present invention is to provide a method of operating a fuel cell apparatus in which the reforming reaction in the reforming portion can be controlled (changed) at the starting time of the apparatus according to the temperatures of the reforming portion and the vaporizing portion at the starting time of the apparatus so that the fuel cell apparatus can efficiently start while the reforming catalyst can be less likely to deteriorate.

A fuel cell apparatus of the present invention comprises a cell stack, a reforming portion, a vaporizing portion, a reforming target gas supply portion, an oxygen-containing gas supply portion, a water supply portion, and a controller. The cell stack comprises a plurality of fuel cells electrically connected in series in a housing case. The reforming portion is disposed over the cell stack and is to be exposed to a gas produced by burning a fuel gas from the fuel cells. The reforming portion comprises a reforming catalyst. The reforming catalyst can perform partial oxidation reforming, autothermal reforming and steam reforming as a reforming reaction. The vaporizing portion generates steam to be supplied to the reforming portion. The reforming target gas supply portion supplies a reforming target gas to the reforming portion. The oxygen-containing gas supply portion supplies an oxygen-containing gas to the reforming portion. The water supply portion supplies water to the vaporizing portion. The controller controls the reforming reaction in the reforming portion.

When the temperature of the reforming portion at the starting time of the fuel cell apparatus is lower than a temperature at which the steam reforming can be performed, the controller controls the reforming target gas supply portion, the oxygen-containing gas supply portion and the water supply portion to perform a first control by which the reforming reaction in the reforming portion is performed in the order of the partial oxidation reforming, the autothermal reforming and the steam reforming. When the reforming portion has the steam reforming-possible temperature and the temperature of the vaporizing portion is lower than a temperature at which a predetermined amount of steam can be generated, at the starting time of the fuel cell apparatus, the controller controls the reforming target gas supply portion, the oxygen-containing gas supply portion and the water supply portion to perform a second control by which the reforming reaction in the reforming portion is performed in the order of the autothermal reforming and the steam reforming. When the reforming portion has the steam reforming-possible temperature and the vaporizing portion has the temperature at which a predetermined amount of steam can be generated, at the staring time of the fuel cell apparatus, the controller controls the reforming target gas supply portion, the oxygen-containing gas supply portion and the water supply portion to perform a third control by which the reforming reaction in the reforming portion is performed by the steam reforming.

BRIEF DESCRIPTION OF DRAWINGS

The objects, features and advantages of the present invention will be apparent from the following detailed description and drawings.

FIG. 4 illustrates one embodiment of a method of operating the fuel cell apparatus of FIGS. 1 to 3.

DETAILED DESCRIPTION

Preferred embodiments of the present invention will now be described in detail with reference to the drawings.

Figure 1:
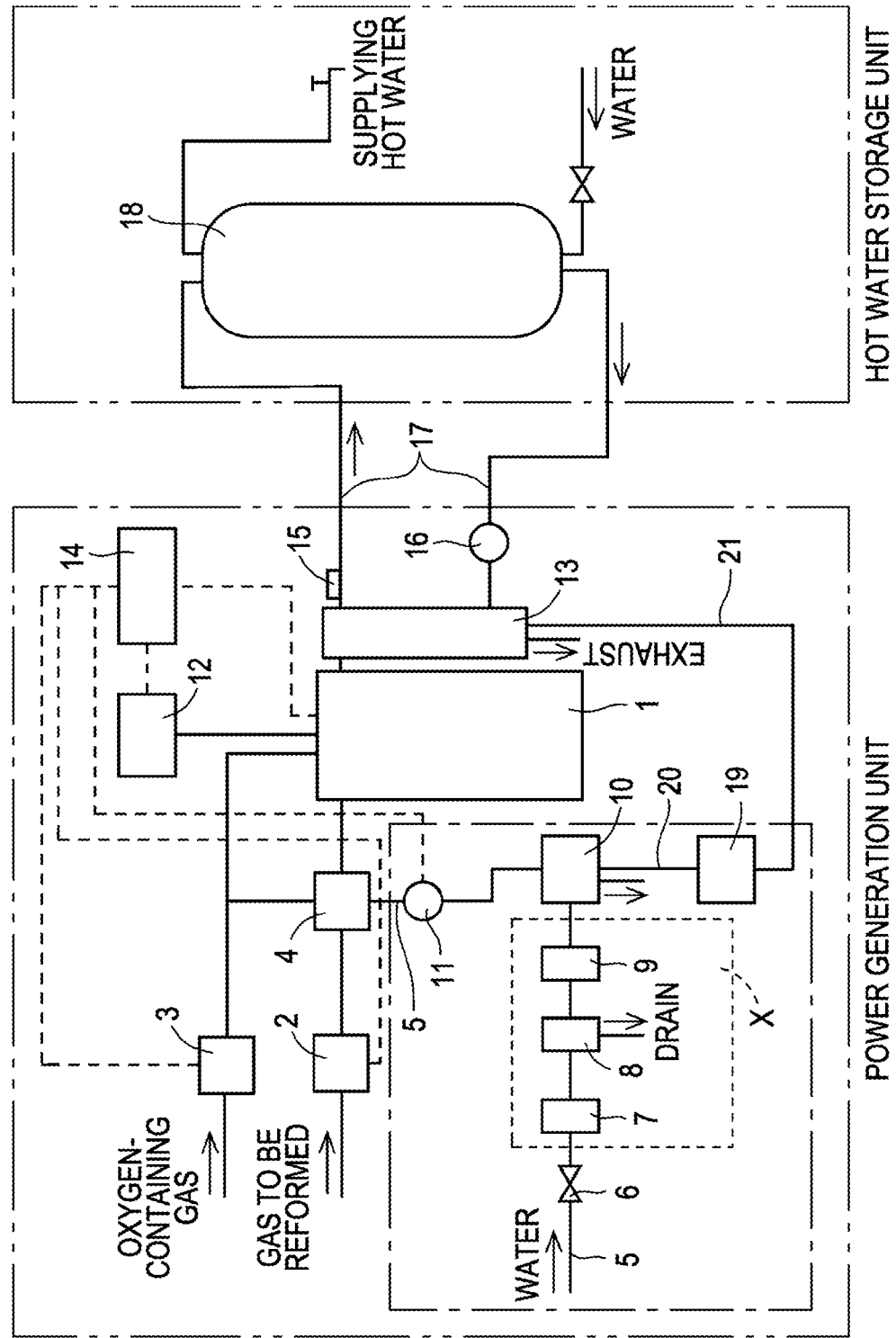
FIG. 1 is a block diagram of a fuel cell apparatus according to the present invention.

FIG. 1 is a block diagram of one embodiment of a fuel cell system comprising a fuel cell apparatus. The fuel cell system comprises a power generation unit generating electric power, which is a fuel cell apparatus, a hot water storage unit in which heat-exchanged hot water is stored, and circulation piping through which water circulates between these units.

The fuel cell apparatus shown in FIG. 1 comprises a reforming target gas supply portion 2 supplying a raw fuel, such as natural gas or kerosene (corresponding to the reforming target gas if natural gas is used), a reformer 4 integrally comprising a reforming portion comprising a reforming catalyst for reforming the reforming target gas and a vaporizing portion generating steam to be supplied to the reforming portion, and an oxygen-containing gas supply portion 3 supplying an oxygen-containing gas to the reformer 4 (reforming portion) and a fuel cell (cells) 1. The reforming catalyst provided in the reforming portion can perform at least one reforming of partial oxidation reforming, autothermal reforming and steam reforming. Although FIG. 1 shows a reformer 4 in which a reforming portion comprising a reforming catalyst and a vaporizing portion generating steam to be supplied to the reforming portion are integrated in one body, the reforming portion and the vaporizing portion may be disposed separately. In the following description, the reformer 4 integrally comprises a reforming portion and a vaporizing portion.

In the fuel cell apparatus shown in FIG. 1, condensed water produced by heat exchange between exhaust gas discharged from the fuel cell 1 and water is mainly used as water for steam reforming in the reformer 4. More specifically, the fuel cell apparatus shown in FIG. 1 comprises a heat exchanger 13 performing heat exchange between water and exhaust gas (exhaust heat) produced by power generation of the fuel cell 1, a condensed water tank 19 in which condensed water produced by the heat exchange is stored, and a condensed water delivery tubing 21 through which condensed water produced in the heat exchanger 13 is supplied to the condensed water tank 19. The water (condensed water) in the condensed water tank 19 is supplied to the reformer 4 (vaporizing portion) with a water pump 11.

In the fuel cell apparatus shown in FIG. 1, a water treatment apparatus X is provided in combination, which supplies external water (for example, city water) to the reformer 4 (vaporizing portion) if the amount of water in the condensed water tank 19 is small. The water treatment apparatus X comprises a charcoal filter device 7 purifying water, a reverse osmosis membrane device 8, and an ion-exchange resin device 9 preparing pure water from the purified water. These devices are connected in that order through water delivery tubing 5. The water delivery tubing 5 comprises a water feed valve 6 controlling the amount of water to be delivered to the water delivery tubing 5. The pure water produced in the ion-exchange resin device 9 is stored in a water tank 10 and is supplied to the reformer 4 (vaporizing portion) with the water pump 11. FIG. 1 shows a state where the condensed water tank 19 and the water tank 10 are connected through a tank connection tube 20. The condensed water or the pure water produced from external water stored in the water tank 10 is supplied to the reformer 4 (vaporizing portion) with the water pump 11. In FIG. 1, the unit for supplying water to the reformer 4 (vaporizing portion) is surrounded by a dotted chain line.

Figure 2:
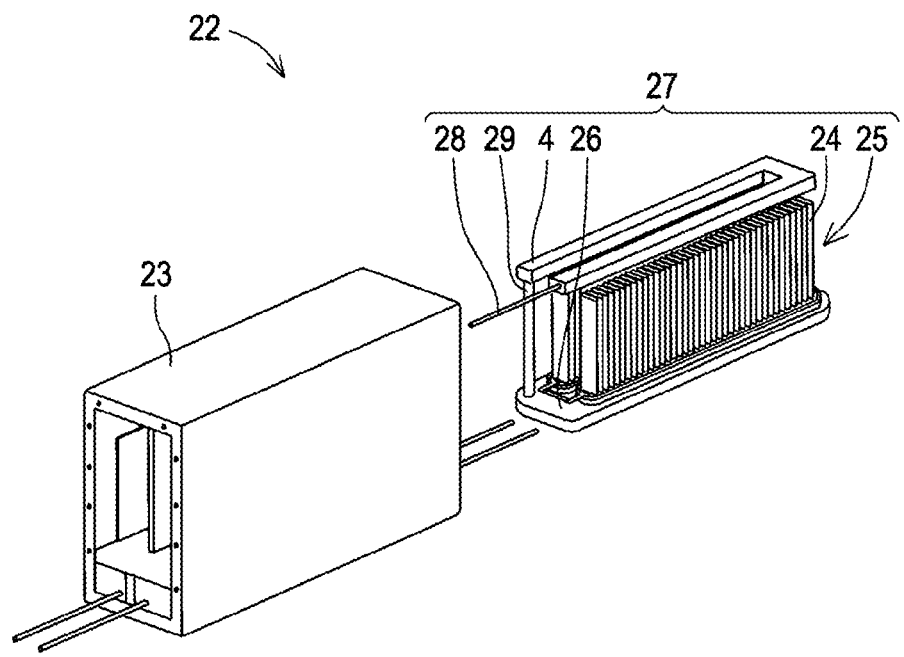
FIG. 2 is a perspective view of a fuel cell module of the fuel cell apparatus according to the present invention.

The reformer 4 is housed with the fuel cell 1 in a casing and is disposed over one ends of the fuel cells, as shown in detail in FIG. 2. By burning a fuel gas (reformed gas) supplied to the fuel cells or a gas (reforming target gas) unreacted in the reformer 4 (reforming portion) in one end side of the fuel cells, the temperature of the reformer 4 (reforming portion and vaporizing portion) can further be increased.

The fuel cell apparatus shown in FIG. 1 further comprises a power conditioner 12 converting direct current power generated in the fuel cell 1 to alternating current power and delivering the converted power to an external load. By connecting the power conditioner 12 to a system power source (load), the fuel cell 1 starts power generation, and load following operation starts.

The fuel cell apparatus shown in FIG. 1 further comprises a controller 14 controlling the reforming target gas supply portion 2, the oxygen-containing gas supply portion 3 and the power conditioner 12. The controller 14 may comprise control portions performing their respective controls, which will be described later, in a housing case, or each control portion may act as an independent controller.

In FIG. 1, an outlet water temperature sensor 15 measuring the temperature of water (circulating water) subjected to power generation in the fuel cell 1 and flowing through the outlet of the heat exchanger 13 is disposed at the outlet of the heat exchanger 13. The above-described devices and components and a below-described circulation pump 16 are housed in an enclosure, and the power generation unit (fuel battery apparatus of the present invention) is thus structured.

The hot water storage unit comprises a hot water tank 18 in which heat-exchanged hot water is stored, and further comprises a circulation piping 17 through which water circulates between the heat exchanger 13 and the hot water tank 18. Thus, the power generation unit (fuel cell apparatus), the hot water storage unit and the circulation piping 17 comprise the fuel cell system. A circulation pump 16 may be installed in the circulation piping 17.

The arrows in the figure indicate the directions in which the fuel gas, the oxygen-containing gas and water flow. The dashed lines represent mainly paths through which signals are transmitted to or from the controller 14. The same parts are designated by the same reference numerals, and the same applies below.

Various types of fuel cell are known, and solid oxide fuel cells may be used from the viewpoint of miniaturizing the fuel cell. Accordingly, the auxiliary devices used for the operation of the fuel cell can be miniaturized as well as the fuel cell, and the fuel cell apparatus can thus be downsized. In addition, load following operation is available, which is required for household fuel cell and is operated depending on the varying load.

FIG. 2 is an external perspective view of a fuel cell module 22, which is an element of the fuel cell apparatus of the present invention. The fuel cell module 22 comprises a cell stack 25 within a rectangular casing 23. The cell stack 25 comprises a plurality of fuel cells 24 arranged in parallel and electrically connected in series. FIG. 2 shows hollow planar fuel cells 24 through which the fuel gas (hydrogen-containing gas) passes in the longitudinal direction.

The reformer 4 is disposed over the cell stack 25, that is, over one ends (upper ends) of the fuel cells 24. The reformer 4 shown in FIG. 2 comprises integrally a reforming portion and a vaporizing portion, as well. Thus, the unreacted fuel gas to be supplied to the fuel cells 24, the reforming target gas not reformed in the reformer and the oxygen-containing gas delivered into the casing 23 by the oxygen-containing gas supply portion 3 can be burned in one end side (reformer 4 side) of the fuel cells 24, and heat generated by the combustion heats the reformer 4 (reforming portion and vaporizing portion).

The reformer 4 has a U shape and in which the vaporizing portion is disposed at the end side thereof connected to a delivery tube 28 delivering the reforming target gas, the oxygen-containing gas and water (steam), and then the reforming portion is disposed. The reforming target gas delivered through the delivery tube 28 is reformed into a reformed gas (hydrogen-containing gas acting as fuel gas) with the reforming catalyst (shown in FIG. 3 in detail) in the reformer 4 (reforming portion). The fuel gas produced in the reformer 4 (reforming portion) is delivered to a manifold 26 through which the fuel gas is supplied to the fuel cells 24 through a fuel gas delivery tube 29.

The cell stack 25 is disposed in a standing position on the upper surface of the manifold 26 through which the fuel gas (hydrogen-containing gas) produced in the reformer 4 (reforming portion) is supplied to the fuel cells 24. A fuel cell stack device 27 is thus structured.

FIG. 2 shows a state where some (a front face and a back face) of the casing 23 are removed and the fuel cell stack device 27 is pulled out backward from the casing 23. In the fuel cell module 22 shown in FIG. 2, the fuel cell stack device 27 can be slid into the casing 23.

The delivery tube 28 can take any form as long as it can deliver the reforming target gas, the oxygen-containing gas and water (steam). For example, respective delivery tubes (three tubes) may be provided for delivering the reforming target gas, the oxygen-containing gas and water (steam), or a double or triple tube may be provided.

Figure 3:
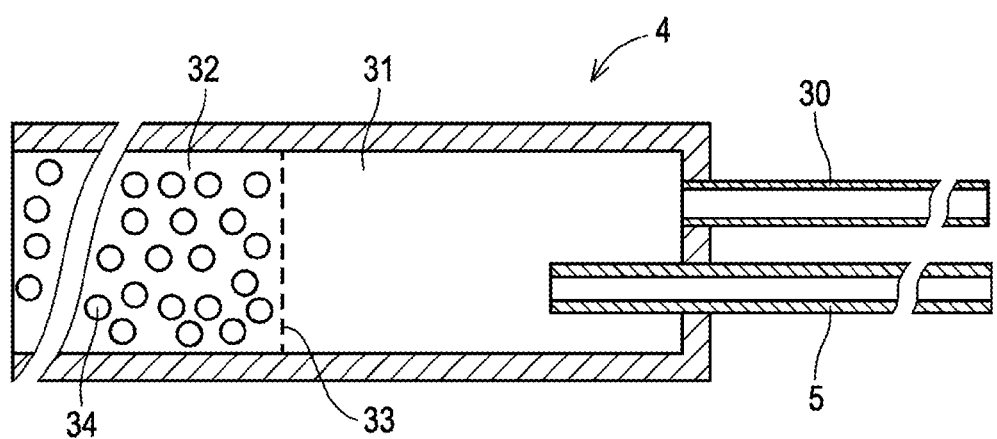
FIG. 3 is an enlarged fragmentary sectional view of a reformer of the fuel cell apparatus according to the present invention.

FIG. 3 is an enlarged view of the U-shaped reformer 4 shown in FIG. 2, partially showing a portion connected to the delivery tube 28. The reformer 4 (vaporizing portion) shown in FIG. 3 is connected to the water delivery tubing 5 through which water is delivered and a gas delivery tubing 30 through which the reforming target gas and the oxygen-containing gas are delivered. Although the gas delivery tubing 30 shown in FIG. 3 delivers a mixture of the reforming target gas and the oxygen-containing gas to the reformer 4 (vaporizing portion), independent gas delivery tubes or may be provided for the respective gases, or a double tube may be provided.

The reformer 4 shown in FIG. 3 integrally comprises a vaporizing portion 31 vaporizing water supplied through the water delivery tubing 5 and a reforming portion 32 performing the reforming reaction. The vaporizing portion 31 and the reforming portion 32 are separated by a gas-permeable wall 33. The water delivery tubing 5 is extended to the interior of the vaporizing portion 31. The water passing through the water delivery tubing 5 inside the vaporizing portion 31 is vaporized into steam, and the steam is thus supplied to the vaporizing portion 31. The vaporization of water may be performed inside the vaporizing portion 31 by vaporizing droplets of the water delivered through the water delivery tubing 5 and dropped in the vaporizing portion 31. In the reformer 4 integrally comprising the vaporizing portion 31 and the reforming portion 32, the vaporizing portion 31 and entrance of the reforming portion 32 have substantially the same temperature. The reforming portion 32 comprises a reforming catalyst 34 that mixes the steam and/or the oxygen-containing gas and the reforming target gas and reforms the reforming target gas into a hydrogen-containing gas.

Known catalysts may be used as the reforming catalyst 34. For example, a noble metal catalyst may be used which is spherical $Al_2O_3$, $ZrO_2$ or the like holding a metal such as Ru or Pt on its surface, or a base metal catalyst may be used which is spherical $Al_2O_3$, $ZrO_2$ or the like holding a metal such as Ni on its surface. These catalysts may be mixed. If a base metal catalyst and a noble metal catalyst are used in combination, the noble metal catalyst may be disposed near the entrance (at the vaporizing portion 31 side) of the reforming portion 32 and then the base metal catalyst is disposed at the back side of the noble metal catalyst (to the exit of the reforming portion 32).

Since the vaporizing portion 31 and the reforming portion 32 are integrated into one body, the reforming target gas and oxygen-containing gas to be supplied to the reforming portion 32 are delivered through the vaporizing portion 31.

The reforming reaction performed at the starting time of the fuel cell apparatus having the structure shown in FIGS. 2 and 3 will now be described. FIG. 4 is a flow chart of one embodiment of a method of controlling operation of the fuel cell apparatus with the controller 14. In an embodiment of the fuel cell method of the present invention, the reforming reaction in the reforming portion 32 is controlled according to the temperature of the reforming portion 32 and the vaporizing portion 31 at the starting time of the fuel cell apparatus.

Specifically, when the temperature of the reforming portion 32 at the starting time of the fuel cell apparatus is lower than a temperature at which steam reforming can be performed, the controller 14 controls the reforming target gas supply portion 2, the oxygen-containing gas supply portion 3 and the water supply portion (for example, water pump 11) to perform a first control (steps S1-S2-S1-S3-S4-S3-S5-S6-S5-S7) by which the reforming reaction in the reforming portion 32 is performed in the order of partial oxidation reforming, autothermal reforming and steam reforming. The oxygen-containing gas supply portion 3 may double as a fuel cell-designating oxygen-containing gas supply portion supplying the oxygen-containing gas to the fuel cells 24 (casing 23). In the following description, the oxygen-containing gas supply portion 3 doubles as a portion for supplying the oxygen-containing gas to both the reforming portion 32 and the casing 23.

First, when the temperature of the reforming portion 32 at the starting time of the fuel cell apparatus is lower than a temperature at which steam reforming, particularly partial oxidation reforming, can be performed (when step 1 is yes, such as when the fuel cell apparatus is started for the first time or when the reforming portion 32 has room temperature because of long-time suspension or stop of the fuel cell apparatus), the reformer 4 is heated by heat generated in one end sides (reformer 4 side) of the fuel cells 24 by burning the unreacted gas (reforming target gas) supplied to the fuel cells 24 and the oxygen-containing gas supplied into the casing 23 (fuel cells 24) by the oxygen-containing gas supply portion 3 (Step S2). For this step, a mixture of the reforming target gas and the oxygen-containing gas in a predetermined proportion may be supplied to the fuel cells 24 to burn in one end sides of the cells. Heating means, such as a heater, may be used to heat the reformer 4, or combustion and use of a heater may be combined to heat the reformer 4. The temperatures of the reforming portion 32 and the vaporizing portion 31 are thus increased. In this state, the controller 14 performs a control so that the reforming target gas is supplied to the reforming portion 32 from the reforming target gas supply portion 2 supplying the reforming target gas, and so that the oxygen-containing gas is supplied to the casing 23 (fuel cells 24) from the oxygen-containing gas supply portion 3. A gas pump or the like may be used as the reforming target gas supply portion 2 supplying the reforming target gas, and an oxygen-containing gas supply blower or the like may be used as the oxygen-containing gas supply portion 3 supplying the oxygen-containing gas.

When the reforming portion 32 has a temperature at which partial oxidation reforming can be performed (when step S1 is NO) and lower than a temperature at which steam reforming can be performed (when step S3 is YES), a control is performed by which partial oxidation reforming is performed in the reforming portion 32 (step S4). More specifically, the controller 14 performs a control so that the reforming target gas is supplied to the reforming portion 32 through the vaporizing portion 31 from the reforming target gas supply portion 2 supplying the reforming target gas, so that the oxygen-containing gas is supplied to the reforming portion 32 (through the vaporizing portion 31) and the interior of the casing 23 (fuel cells 24) from the oxygen-containing gas supply portion 3.

Consequently, partial oxidation reforming can be performed in the reforming portion 32 with the reforming target gas supplied from the reforming target gas supply portion 2 through the vaporizing portion 31 and the oxygen-containing gas supplied from the oxygen-containing gas supply portion 3 through the vaporizing portion 31.

In this instance, the partial oxidation reforming is an exothermic reaction. Accordingly, the temperature of the reforming portion 32 can be increased by heat generated by the partial oxidation reforming after this reaction starts. Therefore, heating means, such as a heater, can be stopped. Combustion reaction in one end sides of the fuel cells 24 is continuously performed so as to increase or keep the temperature of the fuel cells 24, and in addition so as to make the fuel gas, the unreacted gas (reforming target gas) or the like less likely to exhaust.

When the reforming portion 32 has a temperature at which steam reforming can be performed (when step S3 is No) and the vaporizing portion 31 comes to a temperature lower than a temperature at which a predetermined amount of steam can be generated (when step S5 is YES), a control is performed by which the reforming reaction is switched to autothermal reforming using partial oxidation reforming and steam reforming in combination to make the reforming portion 32 less likely to be excessively heated by heat generated by reaction of partial oxidation reforming and heat generated by the combustion in one end sides of the fuel cells 24, and to perform the reforming reaction efficiently (step S6).

In the state where autothermal reforming is performed, the controller 14 performs a control so that the reforming target gas is supplied to the reforming portion 32 from the reforming target gas supply portion 2 through the vaporizing portion 31, so that the oxygen-containing gas is supplied to the reforming portion 32 through the vaporizing portion 31 and to the interior of the casing 23 (fuel cells 24) from the oxygen-containing gas supply portion 3, and so that water is supplied to the vaporizing portion 31 from the water supply portion.

In this instance, condensed water, which is produced by heat exchange in the heat exchanger 13, may not be produced sufficiently. In such a case, water (pure water) treated by the water treatment apparatus X and stored in the water tank 10 can be supplied to the vaporizing portion 31. If the fuel cell apparatus does not comprise such a water treatment-apparatus X, such pure water as can be supplied to the vaporizing portion 31 is fed into the water tank 10 (condensed water tank 19) from the outside of the fuel cell apparatus and is supplied to the vaporizing portion 31 by the water pump 11.

The temperature of the vaporizing portion 31 at which a predetermined amount of steam can be generated refers to a temperature at which an amount of steam required for performing only steam reforming can be produced when only steam reforming is performed in the reforming portion 32. The temperature at which the predetermined amount of steam can be generated can be appropriately set according to, for example, the amount of reforming target gas supply, and may be 200 to 300° C. or more. If the reforming target gas flows through the vaporizing portion 31, the temperature of the vaporizing portion 31 at which the predetermined amount of steam can be generated is preferably set to a temperature at which the reforming target gas is not decomposed by, for example, heat, and at which the reforming catalyst in the reforming portion 32 is not adversely affected.

When the reforming portion 32 comes to a temperature at which steam reforming can be performed (when step S3 is No) and the vaporizing portion 31 comes to a temperature at which the predetermined amount of steam can be produced (when step S5 is No), the reforming reaction is switched to steam reforming, which can most efficiently perform the reforming reaction, that is, can produce the largest amount of hydrogen (step S7).

For the steam reforming, the controller 14 controls the reforming target gas supply portion 2 to supply the reforming target gas to the reforming portion 32 through the vaporizing portion 31, and controls the water supply portion to supply water to the vaporizing portion 31. The oxygen-containing gas supply portion 3 is controlled to supply the oxygen-containing gas to the interior of the casing 23 (fuel cells 24), and to stop the supply of the oxygen-containing gas to the reforming portion 32 through the vaporizing portion 31.

Consequently, the reforming portion 32 performs only steam reforming, and, thus, the most efficient reforming reaction can be performed. Then, when the temperature of the fuel cells 24 increases to a value at which the fuel cells can generate electric power, the start-up operation of the fuel cell apparatus is completed to start power generation in the fuel cells 24 (that is, normal operation starts).

The temperature at which partial oxidation reforming can be performed and the temperature at which steam reforming can be performed can be appropriately set according to the type and characteristics of the reforming catalyst in the reforming portion 32 and the type of raw fuel supplied to the reforming portion 32.

If, for example, a Ni-based reforming catalyst is used as the reforming catalyst and city gas is used as the raw fuel (reforming target gas), the partial oxidation reforming-possible temperature can be set to 250 to 300° C. or more, and the steam reforming-possible temperature can be set to 350 to 450° C. or more. The temperature of the vaporizing portion 31 at which a predetermined amount of steam can be generated can be set to 200 to 300° C. or more as mentioned above.

If a Ru-based reforming catalyst is used as the reforming catalyst, the partial oxidation reforming-possible temperature can set to 200 to 300° C. or more, and the steam reforming-possible temperature can be set to 300 to 450° C. or more. The temperature of the vaporizing portion 31 at which a predetermined amount of steam can be generated can be set to 200 to 300° C. or more as mentioned above.

These temperatures represent peak temperatures of the reforming portion (reforming catalyst), and preferably, the temperature sensor (such as thermocouple) is set such that the sensing portion of the sensor is located within the reforming portion. The measured temperature may differ slightly from the peak temperature depending on the position of the sensing portion in the reforming portion. The partial oxidation reforming-possible temperature and the steam reforming-possible temperature are not therefore limited to the above ranges.

Accompanying the operation of the fuel cell apparatus, it may be suspended in some cases, for example, for maintenance or with an event of failure. In such a case, the period of suspension of the fuel cell apparatus may be over several minutes to several hours (or, in some cases, several days).

Then, after maintenance or repairing the failure, the fuel cell apparatus is restarted to operate. Although the temperature of the reforming portion 32 generally decreases during the suspension of the fuel cell apparatus, it may be kept high, depending on the suspension time of the fuel cell apparatus.

If the fuel cell apparatus is started (restarted) in this state and the reforming reaction starts from the first control, that is, the reforming reaction starts from partial oxidation reforming, the temperature of the reforming target gas can rapidly increase immediately after the supply (or during the supply) of the reforming target gas from the reforming target gas-supply portion 2 to the interior of the reforming portion 32. If the temperature of the reforming target gas rapidly increases, the reforming target gas can be decomposed soon to precipitate carbon from the reforming target gas.

If carbon is precipitated from the reforming target gas, the fuel cells 24 may be degraded. Also, ignition for burning the fuel gas and the unreacted gas (reforming target gas) in one end sides of the fuel cells 24 may become difficult in some cases.

If the fuel cell apparatus is started (restarted) and partial oxidation reforming is performed in a state where the reforming portion 32 has a high temperature, the reforming portion 32 tends to come to high temperature easily. Consequently, the reforming catalyst 34 may, for example, be sintered, and become liable to deteriorate to reduce the lifetime.

Accordingly, in the present invention, when the reforming portion 32 at the starting time of the fuel cell apparatus has a temperature at which steam reforming can be performed (when steps S1 and S3 are NO) and the vaporizing portion 31 has a temperature lower than or equal to a temperature at which a predetermined amount of steam can be generated (when step S5 is YES), the controller 14 controls the reforming target gas supply portion 2, the oxygen-containing gas supply portion 3 and the water supply portion to perform the second control (steps S1-S3-S5-S6-S5-S7) by which the reforming reaction in the reforming portion 32 is performed in the order of autothermal reforming and steam reforming.

Consequently, the reforming reaction is started from autothermal reforming comprising endothermic steam reforming to reduce the rapid increase of the temperature of the reforming portion 32 or to reduce the temperature of the reforming portion 32. Thus, the reforming target gas supplied to the reforming portion 32 can be less likely to increase rapidly in temperature.

Consequently, the precipitation of carbon in the reforming target gas can be reduced at the starting time of the fuel cell apparatus, and the fuel cells 24 can thus be less likely to deteriorate. In addition, ignition in one end sides of the fuel cells 24 can be easily performed.

Furthermore, since the reforming portion 32 can be less likely to come to high temperature by performing the reforming reaction skipping partial oxidation reforming, the reforming catalyst 34 can be less likely to deteriorate.

When the reforming portion 32 at the starting time of the fuel cell apparatus has a temperature at which steam reforming can be performed (when steps S1 and S3 are NO) and the vaporizing portion has a temperature at which a predetermined amount of steam can be generated (when step S5 is NO), the controller 14 controls the reforming target gas supply portion 2, the oxygen-containing gas supply portion 3 and the water supply portion to perform the third control (steps S1-S3-S5-S7) by which the reforming reaction in the reforming portion 32 is performed by steam reforming.

Consequently, the precipitation of carbon in the reforming target gas can be reduced at the starting time of the fuel cell apparatus, as in the second control, and the fuel cell 24 can thus be less likely to deteriorate. Also, ignition in one end sides of the fuel cells 24 can be easily performed. Also, since partial oxidation reforming can be skipped, the reforming portion can be less likely to come to high temperature at the starting time of the fuel cell apparatus, and accordingly, the reforming catalyst 34 can be less likely to deteriorate.

For the second control and the third control, the reforming target gas supply portion 2, the oxygen-containing gas supply portion 3 and the water supply portion can be controlled, as in the first control.

If autothermal reforming is performed in a high oxygen content by the second control, the reformer 4 easily comes to high temperature as with partial oxidation reforming. Accordingly, the amount of oxygen-containing gas to be supplied to the reformer 4 may be reduced for the autothermal reforming by the second control.

More specifically, the controller 14 can control the reforming target gas supply portion 2 and the oxygen-containing gas supply portion 3 so that the amount of reforming target gas supply for autothermal reforming is the same between the first control and the second control, and so that the ratio of the amount of oxygen-containing gas supply to the reformer 4 to the amount of reforming target gas supply to the reformer 4 (hereinafter represented by $O_2/C$) for autothermal reforming by the second control is smaller than the $O_2/C$ for autothermal reforming by the first control. The amount of reforming target gas supply may be represented in terms of the value measured with a flow meter or the like, or in terms of the amount of carbon (C) in the reforming target gas. In the following description, the reforming target gas supply is represented in terms of the amount of carbon (C) in the reforming target gas.

More specifically, the reforming target gas supply portion 2 is controlled so that the amount of reforming target gas supply for the autothermal reforming is the same between the first control and the second control. At the same time, the oxygen-containing gas supply portion 3 is controlled so that the $O_2/C$ for the autothermal reforming by the first control lies in the range of 0.4 to 1.0 in order to reduce the precipitation of carbon. Although the $O_2/C$ for the autothermal reforming by the second control can be set to be smaller than the $O_2/C$ for the autothermal reforming by the first control, it is preferable that oxygen-containing gas supply portion 3 be controlled so that the $O_2/C$ for the autothermal reforming by the second control is reduced to half of the $O_2/C$ for the autothermal reforming by the first control, from the viewpoint of further reducing deteriorating of the reforming catalyst 34.

For example, when the $O_2/C$ for the autothermal reforming by the first control is 0.6, the oxygen-containing gas supply portion 3 is preferably controlled so that the $O_2/C$ for the autothermal reforming by the second control is 0.3.

The reforming catalyst 34 can thus be less likely to come to high temperature when the second control is performed at the starting time of the fuel cell apparatus, and consequently, the reforming catalyst 34 can be less likely to deteriorate.

When the second or third control is performed at the starting time of the fuel cell apparatus, the controller 14 can control the water supply portion so that the amount of steam supplied to the reforming portion 32 for the autothermal reforming by the second control is larger than that for the autothermal reforming by the first control, and so that the amount of steam supplied to the reforming portion 32 for the steam reforming by the third control is larger than that for the steam reforming by the first control. Thus, the reforming portion 32 can be less likely to rapidly increase in temperature when the second or third control is performed at the starting time of the fuel cell apparatus. Consequently, the reforming target gas supplied to the reforming portion 32 can be less likely to rapidly increase in temperature. Since when the second or third control is performed at the starting time of the fuel cell apparatus, the precipitation of carbon from the reforming target gas can be reduced to make the fuel cells 24 less likely to deteriorate, the fuel cell apparatus can be efficiently started.

By controlling the ratio of the amount of water (steam) supplied to the reforming portion 32 to the amount of reforming target gas supplied to the reforming portion 32 (hereinafter represented by S/C) for the autothermal reforming by the second control to be larger than the S/C for the autothermal reforming by the first control, and controlling the S/C for the steam reforming by the third control to be larger than the S/C for the steam reforming by the first control, the temperature (entrance temperature) of the reforming portion 32 can be reduced to be less likely to rapidly increase the temperature of the reforming target gas supplied to the reforming portion 4-32.

Preferably, the S/C ratio for the first control is in the range of 1.5 to 3.5 from the viewpoint of reducing the precipitation of carbon and the degradation of the fuel cell performance. For example, when the S/C for the autothermal reforming by the first control is 3.0, the S/C for the autothermal reforming by the second control or for the steam reforming by the third control is preferably set to 4.0.

Since the precipitation of carbon in the reforming target gas is thus reduced, the fuel cells 24 can be less likely to deteriorate. Consequently, the fuel cell apparatus can be efficiently started.

When the second or third control is performed at the starting time of the fuel cell apparatus, the controller 14 can control the reforming target gas supply portion so that the amount of reforming target gas supply to the reforming portion 32 for the autothermal reforming by the second control is smaller than that for the autothermal reforming by the first control, and so that the amount of reforming target gas supply to the reforming portion 32 for the steam reforming by the third control is smaller than that for the steam reforming by the first control. Consequently, the amount of heat generated by burning the fuel gas and the unreacted gas (reforming target gas) in one end sides of the fuel cells 24 is reduced, and the heat value of autothermal reforming in the reforming portion 32 can be reduced. Consequently, the reforming portion 32 can be less likely to rapidly increase in temperature when the second or third control is performed at the starting time of the fuel cell apparatus. Thus, the reforming target gas supplied to the reforming portion 32 can be less likely to rapidly increase in temperature. Since when the second or third control is performed at the fuel cell apparatus, the precipitation of carbon from the reforming target gas can be reduced to make the fuel cells 24 less likely to deteriorate, the fuel cell apparatus can be efficiently started.

Similarly to the above description, by reducing the temperature (entrance temperature) of the reforming portion 32, the reforming target gas supplied to the reforming portion 32 can be less likely to rapidly increase in temperature. Accordingly, by reducing the amount of reforming target gas supply to the reforming portion 32, the heat value of the autothermal reforming in the reforming portion 32 can be reduced. Also, by reducing the amount of reforming target gas supply, the amount of heat of the combustion in one end sides of the fuel cells 24 can be reduced as well as the amount of fuel gas and unreacted gas (reforming target gas). Since rapid increase of the reforming portion 32 temperature can thus be reduced to make carbon less likely to precipitate from the reforming target gas, the fuel cells 24 can be less likely to deteriorate, and the fuel cell apparatus can be efficiently started.

For example, if the amount of reforming target gas supply is 1.5 to 4.0 L/min for the first control, the amount of reforming target gas supply for the second control or the third control can be about 70%, that is, 1.0 to 3.0 L/min, relative to the amount of reforming target gas supply for the first control. For example, when the amount of reforming target gas supply for the autothermal reforming or the steam reforming by the first control is 3.0 L/min, the amount of reforming target gas supply for the autothermal reforming by the second control or the amount of reforming target gas supply for the steam reforming by the third control can be set to 2.0 L/min.

In addition, for reducing the rapid increase of the temperature of the reforming portion 32, the reforming portion 32 may be cooled from the outside. More specifically, the fuel cell apparatus may comprise an fuel cell-designating oxygen-containing gas supply portion that supplies an oxygen-containing gas to the fuel cells 24, and the controller 14 controls the fuel cell-designating oxygen-containing gas supply portion so that the amount of oxygen-containing gas supplied to the fuel cells 24 for the autothermal reforming by the second control is larger than that for the autothermal reforming by the first control, and so that the amount of oxygen-containing gas supplied to the fuel cells 24 for the steam reforming by the third control is larger than that for the steam reforming by the first control. Thus, the reforming portion 32 can be less likely to rapidly increase in temperature. Since the precipitation of carbon in the reforming target gas is thus reduced, the fuel cells 24 can be less likely to deteriorate. Preferably, from the viewpoint of miniaturizing the fuel cell apparatus, the oxygen-containing gas supply portion for the fuel cells doubles as the oxygen-containing gas supply portion 3 supplying the oxygen-containing gas to the reforming portion 32 (vaporizing portion 31).

When, for example, the amount of fuel cell-designating oxygen-containing gas supply is 20 to 60 L/min for the first control, the fuel cell-designating oxygen-containing gas supply for the second or third control can be 30 to 80 L/min. Accordingly, when the amount of fuel cell-designating oxygen-containing gas supply is 50 L/min for the autothermal reforming or steam reforming by the first control, the amount of fuel cell-designating oxygen-containing gas supply for the autothermal reforming by the second control or for the steam reforming by the third control can be 60 L/min.

Although the present invention has been described in detail, the invention is not limited to the above-described embodiment, and various modifications may be made without departing from the scope and spirit of the invention.

For example, the controller 14 may perform two or more of the controls of the amounts as described above at one time. This can reduce the precipitation of carbon from the reforming target gas and further make the reforming catalyst 34 less likely to deteriorate.

The method of controlling the fuel cell apparatus described above performs a first control, a second control or a third control according to the reforming portion temperature at the starting time of the fuel cell apparatus. The first control performs a reforming reaction in the reforming portion in the order of partial oxidation reforming, autothermal reforming and steam reforming. The second control performs autothermal reforming and steam reforming in that order, and the third control performs steam reforming. Such controls can reduce rapid increase of the temperature of the reforming target gas supplied to the reforming portion and thus can make carbon in the reforming target gas less likely to precipitate even if the reforming portion at the starting time of the fuel cell apparatus has a temperature at which steam reforming can be performed. Consequently, the fuel cells can be less likely to deteriorate, and the fuel cell apparatus can be efficiently started. In addition, since the second control and the third control start the reforming reaction from the autothermal reforming or the steam reforming without performing partial oxidation reforming, the reforming portion can be less likely to come to high temperature at the starting time of fuel cell apparatus. The reforming catalyst thus can be less likely to deteriorate.

The present invention can be embodied in various forms without departing from the spirit and principal features of the invention. The above-disclosed embodiment is only one version of the invention at all points. The scope of the present invention is specified in the attached claims, and is not restrained by the above description of the specification. All the modifications and variations made within the scope of the claims are within the scope of the present invention.

The invention claimed is:

1. A method for controlling a reforming reaction with a fuel cell apparatus, comprising:
   measuring a temperature of a reforming portion in the fuel cell apparatus at the starting time of the fuel cell apparatus;
   measuring a temperature of a vaporizing portion in the fuel cell apparatus at the starting time of the fuel cell apparatus;
   performing a first reforming reaction, at the starting time of the fuel cell apparatus, in which partial oxidation reforming, autothermal reforming and steam reforming are performed in that order as the reforming reaction when the temperature of the reforming portion is lower than T1, where T1 represents a temperature at which the steam reforming can be performed;
   performing a second reforming reaction, at the starting time of the fuel cell apparatus, in which autothermal reforming and steam reforming are performed in that order, without partial oxidation reforming, as the reforming reaction when the temperature of the reforming portion is not lower than T1 and the temperature of the vaporizing portion is lower than T2, where T2 represents a temperature at which a predetermined amount of steam can be generated by the steam reforming; and
   performing a third reforming reaction, at the starting time of the fuel cell apparatus, in which steam reforming is performed, without partial oxidation reforming and autothermal reforming, as the reforming reaction when the temperature of the reforming portion is not lower than T1 and the temperature of the vaporizing portion is not lower than T2.

2. The method of claim 1, wherein the first, second and third reforming reactions have predetermined reforming conditions, and the first reforming reaction has at least one predetermined reforming condition different from the corresponding predetermined reforming condition of at least one of the second and third reforming reactions.

3. The method of claim 2, wherein the predetermined reforming conditions are autothermal reforming conditions and the first reforming reaction has at least one autothermal reforming condition different from that of the second reforming reaction.

4. The method of claim 3, wherein the autothermal reforming conditions comprise at least the amount of a reforming target gas supplied from a reforming target gas supply portion and the amount of oxygen-containing gas supplied from an oxygen-containing gas supply portion.

5. The method of claim 4, further comprising:
   supplying reforming target gas so that the amount of reforming target gas supply for the autothermal reforming is the same between the first reforming reaction and the second reforming reaction; and
   supplying oxygen-containing gas so that the ratio of the amount of oxygen-containing gas supply to the reforming portion to the amount of reforming target gas supply to the reforming portion for the autothermal reforming by the second reforming reaction is smaller than that for the autothermal reforming by the first reforming reaction.

6. The method of claim 2, wherein the predetermined reforming conditions are steam reforming conditions and the first reforming reaction has a steam reforming condition different from that of the third reforming reaction.

7. The method of claim 6, further comprising:
   supplying steam so that the amount of steam supply to the reforming portion for the autothermal reforming by the second reforming reaction is larger than that for the autothermal reforming by the first reforming reaction, and so that the amount of steam supply to the reforming portion for the steam reforming by the third reforming reaction is larger than that for steam reforming by the first reforming reaction.

8. The method of claim 2, wherein the predetermined reforming conditions are autothermal reforming conditions and steam reforming conditions.

9. The method of claim 8, further comprising:
supplying reforming target gas so that the amount of reforming target gas supply to the reforming portion for the autothermal reforming by the second reforming reaction is smaller than that for the autothermal reforming by the first reforming reaction, and so that the amount of reforming target gas supply to the reforming portion for the steam reforming by the third reforming reaction is smaller than that for the steam reforming by the first reforming reaction.

10. The method of claim 8, further comprising:
supplying oxygen-containing gas so that the amount of oxygen-containing gas supply to fuel cells in the fuel cell apparatus for the autothermal reforming by the second reforming reaction is larger than that for the autothermal reforming by the first reforming reaction, and so that the amount of oxygen-containing gas supply to the fuel cells for the steam reforming by the third reforming reaction is larger than that for the steam reforming by the first reforming reaction.

11. A method for controlling a reforming reaction in a reforming portion of a fuel cell apparatus when the reforming portion is not operating, the method comprising:
measuring a first starting temperature of a reforming portion of a fuel cell apparatus when the fuel cell apparatus starts operation;
measuring a second starting temperature of a vaporizing portion of the fuel cell apparatus when the fuel cell apparatus starts operation; and
starting operation of the reforming reaction, when the fuel cell apparatus starts operation, by starting an autothermal reforming reaction, without partial oxidation reforming, when the first starting temperature is not lower than T1 and the second starting temperature is lower than T2, where T1 represents a temperature at which the steam reforming reaction can be performed, and T2 represents a temperature at which a predetermined amount of steam can be generated by the steam reforming.

12. The method according to claim 11, further comprising:
starting operation of the reforming reaction by starting a steam reforming reaction when the first starting temperature is not lower than T1 and the second starting temperature is not lower than T2.

* * * * *